United States Patent [19]

Kosanovich et al.

[11] 3,740,738
[45] June 19, 1973

[54] UNDERVOLTAGE TRIP CIRCUIT FOR CIRCUIT BREAKER

[75] Inventors: Nicholas S. Kosanovich, W. Palm Beach, Fla.; Morley P. Langley, Trafford, Pa.

[73] Assignee: Westinghouse Electric Corporation, Pittsburgh, Pa.

[22] Filed: Apr. 26, 1971

[21] Appl. No.: 137,475

[52] U.S. Cl. .................. 340/248 B, 317/31, 317/33
[51] Int. Cl. ............................................. G08b 21/00
[58] Field of Search ................... 340/248 R, 248 B; 317/31, 33 R, 51, 54, 148.5, 151; 330/2; 323/17

[56] References Cited
UNITED STATES PATENTS

| | | | |
|---|---|---|---|
| 3,343,036 | 9/1967 | Steen | 317/31 |
| 3,590,325 | 6/1971 | McMillen et al. | 340/248 B |
| 3,311,907 | 3/1967 | Teal | 317/33 R |
| 3,551,746 | 12/1970 | Rubner | 317/33 R |
| 3,489,920 | 1/1970 | Moore et al. | 307/235 |

*Primary Examiner*—John W. Caldwell
*Assistant Examiner*—William M. Wannisky
*Attorney*—A. T. Stratton and C. L. McHale

[57] ABSTRACT

A means for detecting low voltage in a circuit breaker control system comprising a static device and a voltage divider. Upon sensing low control voltage, the static device produces a signal which is applied to a silicon controlled rectifier which then provides a current path for energizing the associated circuit breaker tripping coil from a previously charged capacitor. In addition, a circuit is provided which disables the closing circuit or means of the circuit breaker when an undervoltage condition occurs or is present. Where desired, a capacitive network may be used in conjunction with the static undervoltage detector to delay its operation and to prevent slight fluctuations in voltage from causing the undervoltage detector to actuate a tripping operation of the associated circuit breaker.

22 Claims, 3 Drawing Figures

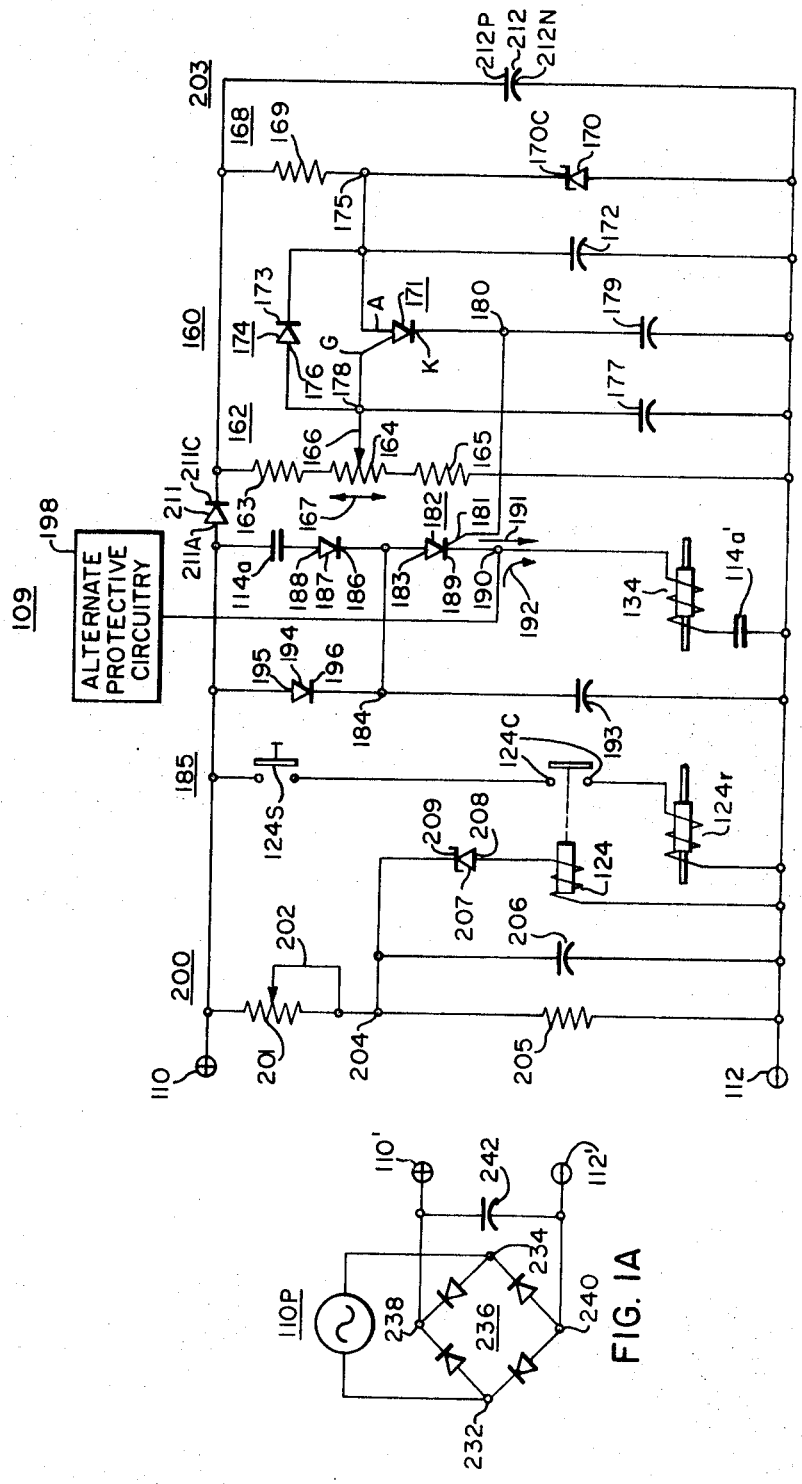

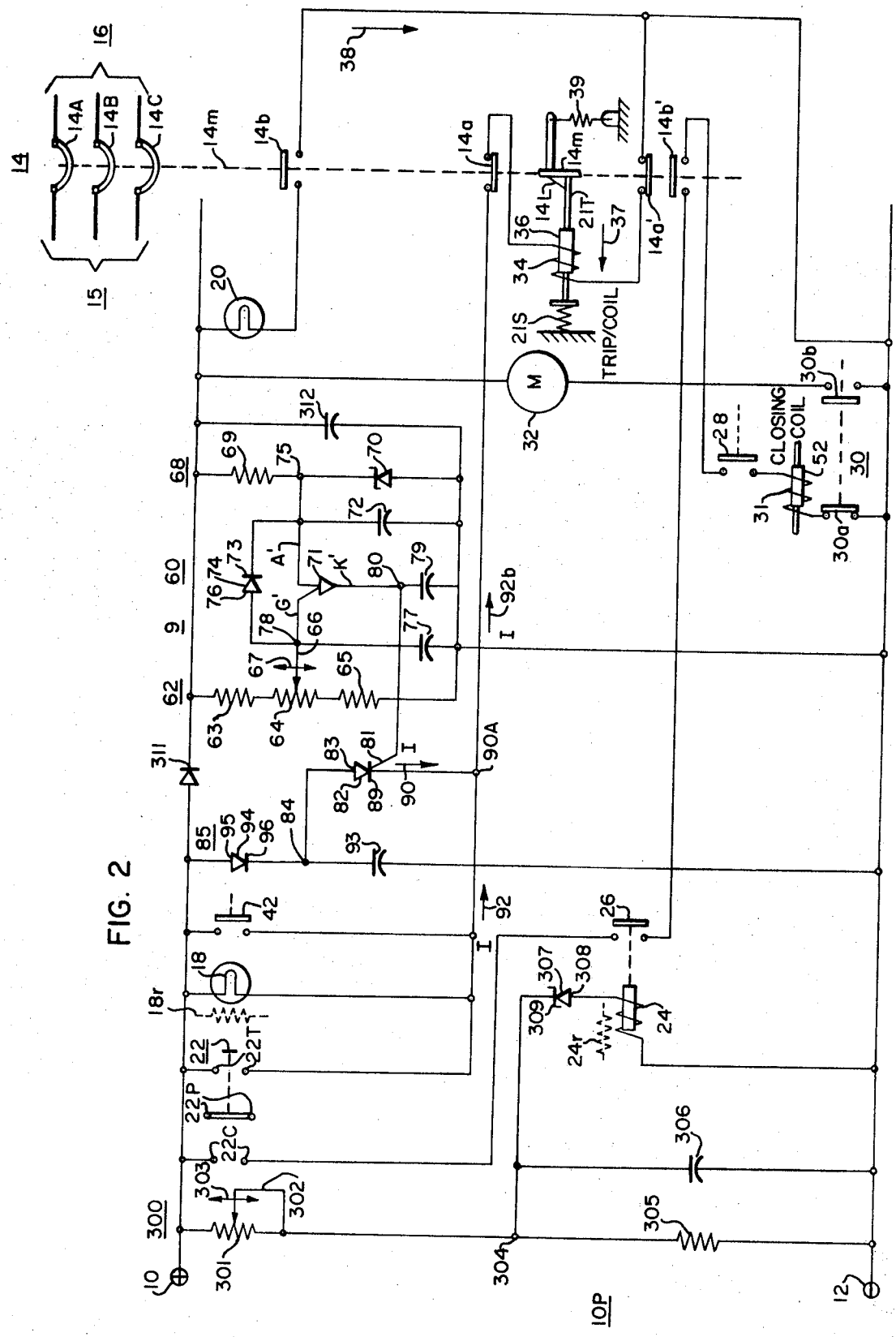

UNDERVOLTAGE TRIP CIRCUIT FOR CIRCUIT BREAKER

CROSS REFERENCES TO RELATED APPLICATIONS

Certain inventions related to those disclosed in the present application are disclosed and claimed in copending application, Ser. No. 19,630, filed Mar. 16, 1970 by J. W. McMillen et al. and assigned to the same assignee as the present application.

BACKGROUND OF THE INVENTION

This invention relates to circuit breaker control circuits and has particular relationship to means for sensing a low voltage condition in the power supply of such a control circuit and actuating a tripping operation of the associated circuit breaker.

Modern high power circuit breakers are usually controlled by some type of electrical control circuit. This control circuit is energized by some source of electrical power, usually a direct current source. In the event that this source should fail or the voltage of the source should decrease below a certain or predetermined value, the associated circuit breaker would effectively be without a control system and thus the very operating conditions for which the circuit breaker was designed to protect would be permitted to continue. The control circuit is usually designed to actuate the opening of the associated circuit breaker under two operating conditions; in response to a manual operation and automatic interruption in response to the presence of a fault in the protected circuit. In both cases, the circuit breaker acts to isolate associated electrical equipment or a portion of an electrical system. Present types of undervoltage detection systems normally include some type of electromechanical components such as disclosed in U.S. Pat. No. 3,300,689 which issued Jan. 24, 1967 to John M. Beddoes. Certain problems arise in such known types of undervoltage detection systems. First, it is difficult to obtain a repeatable minimum actuating voltage because of friction in the electromechanical components in such systems. Second, physical or mechanical shock sometimes causes unwanted and unnecessary operation of such components. Third, systems which include electromechanical components usually require more space than electronic or static systems. Finally, relatively close design tolerances are usually required in the electromechanical components of such systems. Known types of undervoltage sensing systems usually rely upon electromechanical relays to perform some functions prior to energizing the closing coil and are subject to the common problems associated with all relays: chatter, excessive wear, large size and multiplicity of parts. On the other hand, known types of static voltage detection circuits or systems, such as disclosed in U.S. Pat. No. 3,343,036, usually require at least one three-terminal static device to be in a conducting state during normal voltage conditions which shortens the life of the static device and the overall system.

SUMMARY OF THE INVENTION

In accordance with the invention, a circuit breaker is provided including separable main contacts, operating means for opening and closing the contacts, a trip coil for actuating the operating means to open the contacts, and an undervoltage detecting and trigger circuit for actuating the energization of the trip coil from a source of control voltage.

More specifically, the undervoltage detecting and triggering circuit comprises a first voltage divider network connected between the opposite sides of the associated circuit breaker control power source. The first voltage divider network includes a variable resistor or potentiometer to permit adjustment to a specific normal voltage value on the wiper or arm of the potentiometer. Connected generally in parallel with the first voltage divider network is a second voltage divider network which includes a Zener diode in order to produce a predetermined reference voltage across its terminals with normal current. Connected between the wiper of the first voltage divider and the Zener diode reference voltage terminal of the second voltage divider is a unijunction transistor with the gate of the unijunction transistor being connected to the wiper of the potentiometer of the first voltage divider network and the anode on the unijunction transistor being connected to the Zener voltage reference terminal. Where desired, a diode may be connected in parallel with the gate and anode of the unijunction transistor. The cathode of the unijunction transistor is connected to one side of the control supply to be monitored through a capacitor. Both the gate and the anode of the unijunction transistor may also be connected to the same side of the control power supply through capacitors for the purpose of filtering noise and other extraneous signals. The gate electrode of a silicon controlled rectifier (SCR) or gated valve is connected to the junction point between the cathode of the uni-junction and its associated capacitor and the anode-cathode circuit of the SCR is connected generally in parallel with all the other tripping means associated with the circuit breaker, such as the manual tripping means or the remote tripping means.

The anode-cathode circuit of the SCR provides a current path to energize the trip coil of the circuit breaker when an undervoltage operating situation occurs. More specifically, the anode of this silicon control rectifier is connected to the other side of the control power supply to be monitored through a diode. Connected to the junction between this diode and the anode of the silicon controlled rectifier is one terminal of a capacitor which is connected between the terminals of the power supply through the diode. The cathodes of both of these diodes are connected to the same terminal of the power supply as the anode of the controlled rectifier. Under normal operating conditions, the capacitor is quickly charged by the voltage of the circuit breaker control power supply. After having been charged, the capacitor stores sufficient charge to energize the tripping coil, when necessary, until a signal is applied to the gate of the silicon control rectifier indicating an undervoltage condition. The capacitor will not discharge through the control power supply should it drop to a lower voltage because of the presence of the previously mentioned diodes.

The unijunction transistor is connected with the wiper of the first-mentioned voltage divider which is adjusted to normally be at a predetermined voltage. When the power supply voltage drops below a predetermined value, the value of voltage at the wiper of the potentiometer in the first voltage divider will drop or decrease correspondingly thereby reverse biasing the diode mounted across the gate and anode of the unijunction transistor. The voltage at the cathode of this diode is maintained by a Zener diode which will not change its reference voltage until the voltage of the power supply drops below a value which is sufficient to avalanche the Zener diode. When the power supply voltage changes, the gate-to-cathode voltage of the unijunction transistor falls to a value less than the anode-to-cathode voltage and consequently a pulse of current flows from the cathode of the unijunction transistor. This current is derived primarily from the source which is being monitored, but only a very small amount of current need flow and for only a small period of time. This current is applied to the gate of the silicon control rectifier as a pulse, triggering the gate and actuating the anode-to-cathode circuit of the silicon controlled rectifier to a substantially conducting condition. After the gate current turns on the silicon control rectifier, the gate current no longer controls the SCR.

Assuming that the controlled rectifier has been actuated to a conducting state, current can now flow through the silicon controlled rectifier. If the control power supply voltage has decreased to a substantially zero value of voltage, after a short time, the previously-mentioned energy storage capacitor will discharge through the silicon controlled rectifier into the trip coil of the associated circuit breaker to actuate the operating means to trip the contacts of the circuit breaker open thus isolating the electrical circuit which it is protecting.

Where it is desirable not to trip the circuit breaker open because the control power supply only fluctuates slightly, a time delay capacitor may be provided to allow for momentary or transient fluctuations in the circuit breaker control circuit power supply voltage without causing a tripping operation of the circuit breaker. This may be accomplished by connecting an additional diode between the first-mentioned voltage divider and the source of control power and a delay capacitor in parallel with the first and second mentioned voltage dividers. This allows the delay capacitor to be charged through the additional diode but not to discharge through it should the power supply voltage drop only slightly. In the event this happens, the only discharge path for the delay capacitor is through the two voltage divider combinations to ground potential. However, the resistance in each of these branches is of sufficient magnitude relative to the size of the delay capacitor, that the voltage across the delay capacitor and the associated voltage dividers will decrease relatively slowly. It will require a predetermined or relatively long time in comparison with the operation of the circuit in the absence of the time delay capacitor for the voltage on the wiper of the first-mentioned power supply to cause the unijunction transistor to apply a pulse of current to the gate of the silicon control rectifier.

Since it may be necessary to protect the circuit breaker itself during certain operating conditions, an additional voltage detecting circuit may be provided for disabling the circuit breaker closing coil or means should an undervoltage situation exist in the circuit breaker control power supply. This circuit prevents an already open circuit breaker from being closed. This circuit comprises a third voltage divider network comprising at least two resistors connected between the terminals of the control power supply. One of the resistors of the third voltage divider is variable so that the normal voltage at the junction of the two resistors can be adjusted. A capacitor is connected from this junction point to one terminal of the control power supply. A Zener diode is also connected to this terminal at its cathode, through a relay to the other terminal of the control power supply. The relay includes a normally open contact. The Zener diode is chosen to be of such a value that it will not conduct unless the voltage at the junction between the two resistors of the voltage divider is above a predetermined minimum value. For applied voltages above this value, the Zener diode will conduct to energize the relay and actuate the normally open contact to a closed position. Since the contact of this relay is connected in series with the closing coil of the associated circuit breaker, the closing coil can only be energized and the circuit breaker can only be closed when the voltage of the control power supply is above a predetermined normal value. Should the voltage across the two resistors of the third voltage divider fall below a predetermined value, the Zener diode will cease to conduct, thus de-energizing the associated relay and opening the normally open contact. The opening of the latter contact will disable the closing coil and prevent the energizing of the closing coil by any associated means.

BRIEF DESCRIPTION OF THE DRAWINGS

FIG. 1 is a schematic diagram of an undervoltage detection circuit embodying the invention;

FIG. 1A is a view of a rectifier circuit which may be employed with the circuit of FIG. 1 and which can be used to convert alternating current to direct current; and FIG. 2 is a view partly schematic and partly diagrammatic of the circuit shown in FIG. 1 incorporated in an overall circuit breaker system.

DESCRIPTION OF THE PREFERRED EMBODIMENT

Referring now to the drawings and FIG. 1 in particular, the undervoltage detection circuit 109 is shown. The primary component of the undervoltage detection and triggering means 109 is the voltage detector or undervoltage detection and signalling system 160. The voltage detecting circuit 160 comprises a voltage divider 162 which includes three resistive elements or resistors 163, 164 and 165, as illustrated, connected serially between the cathode 211C of diode 211 and terminal 112 of the power supply or primary voltage source 110P which is of the unidirectional or direct current type as shown. Resistive element or potentiometer 164 comprises a movable wiper or variable voltage tapping device 166 capable of moving in either direction as indicated at 167 to lower or raise the voltage at the terminal 178 as the wiper 166 is moved toward the bottom or top, respectively, of resistive element 164. Connected in parallel with the previously named resistive element combination 162 is a voltage divider 168 comprising a fixed resistor or resistive element 169 connected in series circuit relationship with a Zener diode or voltage reference means 170, cathode 170C of the Zener diode 170 being connected to the resistor 169 at junction point 175. The wiper 166 of resistor or potentiometer 164 in voltage divider circuit 162 is connected to node or terminal 178 which, in turn, is connected to the gate or first input terminal G of a unijunction transistor or electronic signalling device 171. The anode or second input terminal A of the unijunction transistor 171 is connected to node or junction point 175. Also connected to junction point 175 is the positive terminal of capacitor 172, the negative terminal of which is connected to the negative power supply terminal 112. The cathode 173 of a diode 174 is also connected to junction 175. The positive terminal of another capacitor 177 is connected to junction point 178, while the negative terminal of the capacitor 177 is connected to the negative power supply terminal 112. The anode 176 of diode 174 is also connected to junction point 178. The cathode or output terminal K of the unijunction transistor or solid state switch 171 is connected to the positive terminal of capacitor or pulse shaping capacitance means 179 at the junction point 180, while the negative terminal of capacitor 179 is connected to the negative power supply terminal 112. The junction point 180 is connected to the gate 181 of a silicon controlled rectifier or gated electrical valve 182.

In order for voltage detection and signalling means 160 to operate properly, wiper or removable terminal 166 of the resistor or resistive element 164 must be adjusted such that the voltage at junction point 178 is approximately one diode voltage drop (approximately 0.6 to 0.7 volts for a typical silicon diode) above or positive with respect to the voltage at terminal or junction 175 which is held at a constant or predetermined value by the reference voltage of the Zener diode 170 as long as the voltage difference between the terminals 110 and 112 of the power supply is greater than the reference voltage. When wiper 166 is adjusted so that the voltage at terminal 178 is approximately one diode voltage drop above the voltage at terminal 175, the unijunction transistor 171 is substantially non-conducting.

In operation of the voltage detector 160, when the voltage of the power supply 110 drops below a predetermined minimal value, the voltage at junction point 178 will correspondingly drop due to the change in voltage across voltage divider network 162. This will back-bias or reverse bias diode or unidirectional current passing device 174 and reduces the voltage at the gate G of unijunction transistor 171 to a lower potential than that of the anode A which is maintained at approximately 15 volts. When this occurs, current will flow from anode A to cathode K of unijunction transistor 171 and a gating pulse or signal is applied to gate 181 of silicon control rectifier 182. It will be noted that when the voltage at terminal 110 of the power supply 110P drops, there will be a tendency for current flowing from anode A to gate K of unijunction transistor 171 to decrease. However, only a short duration of gating signal is necessary to actuate silicon controlled rectifier or solid state switch 182 to a conducting condition and even a rapidly decaying voltage at power supply terminal 110 will provide the voltage spike output signal necessary to gate 181 of silicon controlled rectifier 182 to actuate the controlled rectifier 182 to a conducting condition. Silicon controlled rectifier or gated valve 182 comprises an anode 183 connected to a junction point 184 which is isolated from the positive power supply terminal 110 by a diode or unidirectional current valve 187 whose cathode 186 is connected to the junction point 184 and whose anode 188 is connected to one terminal or of the auxiliary contact 114a of the associated circuit breaker. Junction point 184 is also isolated from the positive power supply terminal 110 by diode 194 which forms part of the auxiliary power supply network 185. Diode 194 has a cathode 196 which is connected to junction point 184 and an anode 195 which is connected to positive power supply terminal 110.

Connected between junction point 184 and negative terminal 112 of the power supply is a energy storing capacitor or alternate voltage source 193 which is adapted to store sufficient energy to energize trip coil 134 should the need arise. It is to be noted that capacitor 193 is charged from the positive power supply terminal 110 through diode 194, and that diode 194 cooperates with diode 187 to prevent return of power from capacitor 193 to terminal 110 should the voltage of terminal 110 drop below the voltage at the positive terminal of capacitor 193. In addition, the charge on the capacitor 193 is prevented from energizing the circuit interrupter tripping coil 134 except when silicon control rectifier 182, which is connected between trip coil 134 and capacitor 193, is actuated by the application of a positive going pulse applied to gate 181 to a conducting condition. During such an operating condition, the capacitor 193 discharges rapidly, through junction point 184, through the anode 183 of the silicon controlled rectifier 182, the cathode 189 of the same silicon controlled rectifier, junction point 190, through trip coil 134, auxiliary contact 114a', and to the negative power supply terminal 112 at the lower terminal of the capacitor 193 as indicated by current 191.

It will be noted that junction point 190 is a common node for currents 191 and 192. Current 192 is the current which normally flows from the protective relays or devices of the control circuit indicated generally at 198 to the trip coil 134. Accordingly, trip coil 134 can be energized either in the normal manner by current 192 or, if there is an undervoltage operating condition, by current 191. The previously described operation of the voltage detector 160 actuates the opening of a circuit breaker or electrical circuit interrupter which has previously been closed.

On the other hand, an open circuit breaker may be prevented from being closed should an undervoltage condition exist at the control system power supply of the circuit breaker. The control circuit 200 of the undervoltage control system 109 accomplishes this purpose. Circuit 200 comprises a voltage divider resistance network which includes a variable resistor or potentiometer 201 having a movable wiper or terminal 202, and a fixed resistor 205. Resistor 201 is connected to the positive power supply terminal 110 at one end and at the other end to junction point or node 204. Connected generally in series circuit relationship with resistor 201 are three parallel connected elements. The first such element is the resistor 205. The second such element is a capacitor 206 which is provided for damping extraneous noise signals and preventing intermittent operation of the circuit 200 and the third such element is a Zener diode 207 the cathode 209 of which is connected to junction point or terminal 204 and the anode 208 of which is connected to a control relay 124. Wiper or movable terminal 202 may be adjusted so that the voltage at junction point 204 is normally of a sufficient magnitude to allow Zener diode or second voltage reference means 207 to conduct. This arrangement normally energizes the relay coil 124 and closes its normally open contact 124C.

In the event that the voltage between terminals 110 and 112 of the control circuit power supply or primary voltage source 110P drops or decreases below a predetermined minimum value, the voltage at junction point 204 will correspondingly drop below the firing or actuating voltage of Zener diode 207. Consequently, the Zener diode 207 will cease to conduct and the contact 124C of control relay or switching means 124 will return to its normally open position. In the open position, the relay contact 124C disables the energizing circuit for the closing coil 124r of the associated circuit breaker. Any other control means which would otherwise actuate a closing operation of the circuit breaker will be prevented from doing so by the open relay contact 124C. In other words, the circuit breaker could not be closed since closing coil 124r could not be energized.

Referring now to FIG. 1A, a conventional rectifier bridge network or circuit 236 which is adapted to be connected to an alternating current source 230 at the input terminals 232 and 234 may be provided to convert alternating current power into direct or unidirectional current power at the unidirectional output terminals 238 and 240, respectively, with the output of the circuit 236 being filtered by capacitor 242. Terminals 110' and 112' which correspond to terminals 110 and 112 in FIG. 1 are connected to the output terminals 238 and 240, respectively.

Referring again to FIG. 1, a time delay means or circuit 203 may be provided where desired as part of the undervoltage detection and triggering means 109. The circuit 203 comprises a capacitor or time delay capacitive element 212 and a diode 211. Diode 211 has its anode 211A connected to the source of power at terminal 110 and its cathode 211C connected to the positive terminal 212P of capacitor 212. The negative terminal 212N of capacitive element 212 is connected to the negative source supply terminal 112. This arrangement allows capacitor 212 to be charged to the full power supply voltage between terminals 110 and 112. If the voltage difference between terminals 110 and 112 drops rapidly due to an intermittent or transient fault condition, voltage divider network 162 and 168 will not respond to the change in voltage as rapidly because of the blocking capability of diode 211 and the energy storing capability of capacitor 212. However, during such an operating condition, capacitor 212 will begin to discharge through the parallel combination of voltage dividers 162 and 168 at a predetermined slow rate. Within a few seconds, if the voltage between terminals 110 and 112 has not been reestablished or restored, the voltage at junction point 178 will drop to a value sufficient to actuate unijunction transistor 171 to initiate an operation of the voltage detector 160 as previously discussed.

Referring now to FIG. 2, circuit breaker control system 9 is shown incorporating the invention previously described in connection with FIG. 1. In addition, other elements of circuit breaker 14 are shown interconnected with the elements of the control system 9 to illustrate the cooperation between the control system 9 and the circuit breaker 14 in response to an undervoltage operating condition.

As can be seen in FIG. 2, voltage detector 60 corresponds to voltage detector 160 in FIG. 1 and includes all of the elements which formed part of the detector 160 shown in FIG. 1. More specifically, the detector 60 includes the parallel resistor voltage dividers 62 and 68, where divider 62 comprises resistors 63, 64 and 65, where resistor 64 has a variable potentiometer wiper 66 connected to junction point 78; and where divider 68 comprises a resistor 69 and Zener diode 70 connected at junction point 75. In addition, the detector 60 includes a unijunction transistor 71 with gate G', anode A' and cathode K' connected between junction point 75 and junction point 78 with gate G' being connected at junction point 78 and with anode A' being connected to junction point 75. Also connected between junction points 78 and 75 is a diode 74 with anode 76 being connected to junction point 78 and cathode 73 being connected to junction point 75. The detector 60 further includes three capacitors 72, 77, 79 which all have their negative terminals connected to the negative power supply terminal 12 and their positive terminals connected to junction point 75, cathode K' of the unijunction transistor 71, and junction point 75, respectively, and which act as noise suppression devices. Also connected to junction point 80 of the detector 60 is the gate 81 of silicon controlled rectifier 82 whose anode 83 is connected to junction point 84. Junction point 84 is isolated from the positive power supply terminal 10 by the diode 94 whose cathode 96 is connected to junction point 84 and whose anode 95 is connected to positive terminal 10 of the circuit breaker control power supply 10P. Capacitor 93 is charged or receives electrical energy through diode 94 and may discharge the energy stored thereon only through silicon control rectifier 82 upon application of a pulse to gate 81 of the silicon controlled rectifier 82 to provide or apply an energizing current 90 to trip coil 34, if necessary during the operation of the detector 60.

Where desired, a time delay circuit may be provided which includes the capacitor 312 and diode 311 and which will prevent the energizing of trip coil 34 except under predetermined conditions of the control power supply undervoltage. Also shown is the circuit breaker control circuit 300 which may be provided to prevent the closing of an open circuit breaker 14. The circuit 300 includes resistors 301 and 305 which form a voltage divider connected at the junction point 304. Resistor or rheostat 301 has a movable element 302 which is movable as indicated at 303 to change the voltage at junction point 304. A damping capacitor 306 is connected between the junction point 304 and the negative terminal 12 of the power supply 10P. Also connected between junction point 304 and the negative terminal of the power supply 10P is a Zener diode 307 whose cathode 309 is connected to junction point 304 and whose anode 308 is connected to the coil 24 whose internal resistance is indicated at 24r of enabling relay 26. When the voltage of the power supply 10P is higher than a predetermined minimum value, current flowing through Zener diode 307 energizes coil 24 maintaining the contact 26 in a closed state. This permits closing coil 31 to be energized by closing switch 22 when desired.

Also connected in circuit relation with the circuit breaker trip coil 24 is a normally open contact 42 which may be actuated by a time delayed overload protective device which may be of the type described in U.S. Pat. No. 3,602,783 issued Aug. 31, 1971 to J. C. Engel et al. Connected in parallel with contact 42 is the circuit breaker control switch 22 having contact 22P which may be moved from its neutral position 22N to its breaker closing position 22T. The closing of either contact 42 or contact 22P of circuit breaker control switch 22 will apply a current 92 to the trip coil 34 of magnitude similar to that of current 90. Either of these currents flows into junction point 90A, and then into the coil 34 to energize trip coil 34 and to open circuit breaker 14 when it is closed. Circuit breaker "closed" indicator 18 whose internal resistance is indicated at 18r glows or is illuminated when circuit breaker 14 is closed and none of the elements connected in parallel with the indicator 18, such as the silicon controlled rectifier 82, switch 42 or the circuit breaker control switch 22 has been actuated.

Either current 90 or current 92 when actuated to flow will flow to the trip coil 34 as indicated as 92b. Current 92b flows through the normally closed auxiliary contact 14a of the circuit breaker 14, through trip coil 34, normally closed auxiliary contact 14a' to the negative power supply terminal 12. Upon being energized, the trip coil 34 actuates plunger 36 of the trip coil mechanism to move in direction 37, compressing spring 21S and releasing the latch 21T from latch position 14L of the circuit breaker linkage 14M. This causes linkage 14M to move in direction 38 under the influence of the force of the biasing spring 39 to open the main contacts 14A, 14B and 14C of the circuit breaker 14 and to close auxiliary contacts 14b and 14b'. The circuit breaker "open" light 20 is thus energized and an energizing circuit for circuit breaker closing coil 31 is set up by the closing of contact 14b'. In addition, if limit switch 30 of the motor 32 is in such a position to indicate that the closing spring (not shown) has been charged to reclose the main circuit breaker terminals 14A, 14B, 14C, then contact 30a will also be closed thus further enabling the energization of closing coil 31. Contact 30b may operate to open and remove power from motor 32 and to prevent further charging of the associated closing spring. Two other control contacts must then be closed to permit the energization of the closing coil 31. One of the contacts may be the enabling contact 26 which is part of the undervoltage detection system. Contact 26 will only close, if current flows through relay coil 24, and current will only flow through coil 24 if the voltage at junction point 304 and power supply terminal 10 are at or above a predetermined minimum value of voltage. Finally, circuit breaker closing coil 31 can be energized by moving contact 22P of control switch 22 from either its neutral position 22N or its circuit breaker open position 22T to a circuit breaker closing position 22C. This allows current to flow from positive power supply terminal 10 through contact 26, auxiliary contact 14b' and latch closing switch 28, closing coil 31, motor limit switch 30a and finally to the negative power supply terminal 12. This energizes coil 31 to actuate plunger 52 in such a manner as to release the previously mentioned closing spring to actuate main circuit breaker contacts 14A, 14B and 14C to the closed positions shown in FIG. 2. This operation electrically connects circuit 15 to circuit 16, changes the position of auxiliary contacts 14b' and 14b to the open positions, actuates auxiliary contacts 14a and 14a' to the closed positions to permit a subsequent tripping operation of circuit breaker 14 and deenergize closing coil 31.

A suitable spring charging mechanism for the circuit breaker 14 is described in detail in U.S. Pat. No. 3,254,186 issued to W. H. Fischer and assigned to the same assignee as the assignee of this application.

It is to be understood that the gated static devices referred to may be any kind of suitable solid state design.

It is also to be understood that the unijunction transistor referred to in both FIGS. 1 and 2 may be replaced by any suitable solid state element or circuit which will conduct current upon a change in voltage between its input terminals.

The apparatus embodying the teachings of this invention has several advantages. For example, a undervoltage detecting and trigger circuit is disclosed which accomplishes energization of the tripping coil of the associated circuit breaker by static electrical means. Another advantage of the undervoltage circuit disclosed is that it maintains its initial accuracy and provides improved repeatability of operating characteristics compared with known electromechanical devices of the same general type because of the absence of friction and susceptibility to mechanical shock which are normally present in such electromechanical devices. A further advantage of this invention is that it need not be installed directly on the associated circuit breaker structure but may be located at some remote point and electrically connected to the appropriate parts of the associated circuit breaker. A still further advantage of the undervoltage detector disclosed is that it may include a time delayed tripping arrangement which allows for slight variations in the control power supply voltage without unnecessarily actuating a tripping operation of the associated circuit breaker. The disclosed undervoltage detector is also physically smaller or more compact than known electromechanical undervoltage sensing devices and therefore requires less space when mounted on the associated circuit breaker. The disclosed undervoltage detector can also be easily added to most existing circuit breaker systems without requiring substantial modification of the circuit breaker or its control system.

We claim as our invention:

1. A circuit breaker for the protection of an electrical system comprising separable main contacts adapted to be connected in said system, operating means for opening and closing said main contacts, a tripping coil energizable to actuate said operating means to open said main contacts, a primary source of control voltage, first means connected between said source and said tripping coil and actuable to energize said tripping coil from said source, a first voltage divider having the input terminals thereof connected to the output terminals of said source of control voltage, said first divider having a first divider output terminal intermediate said input terminals for providing therefrom relative to one of said input terminals a first divider output voltage which is a fraction of the voltage of said primary source of power, a second voltage divider having the input terminals thereof connected to the output terminals of said primary source of control voltage and including therein a voltage regulating device which provides a generally constant voltage thereacross regardless of the value of the output voltage of said primary source of voltage provided that said last mentioned output voltage is greater in absolute value than a predetermined value, said second divider having a second divider output terminal intermediate said second divider input terminals which is electrically connected to one terminal of said voltage regulating device for providing therefrom relative to one of said second divider input terminals a second divider output voltage which is generally a fraction of said voltage of said primary source and which is generally a constant value provided that said control voltage is generally larger in absolute value than said predetermined value, a multiterminal electrical control device having first and second input terminals connected to said first and second divider output terminals respectively and an output terminal, said multiterminal device producing a pulse of electrical energy at said output terminal when the voltage of said first terminal is significantly different than the voltage of said second terminal, a normally substantially non-conducting gated valve having the gate terminal thereof connected to said output terminal of said multiterminal control device and an output circuit connected between said source and said tripping coil, said output circuit of said valve being actuable by said output pulse to a substantially conducting condition to energize said tripping coil when the voltage of said primary source falls below a predetermined value.

2. The combination as claimed in claim 1 wherein said voltage regulation device comprised a Zener diode.

3. The combination as claimed in claim 1 wherein said multiterminal control device comprises a unijunction transistor, wherein said first terminal comprises the gate terminal of said uni-junction transistor, said second terminal comprised the anode terminal thereof and said output terminal comprises the cathode terminal thereof, said pulse of electrical energy being produced when the voltage at said gate is less by a predetermined value than the voltage at said cathode.

4. The combination as claimed in claim 3 wherein said voltage regulating device comprises a Zener diode.

5. The combination as claimed in claim 4 wherein said gated valve comprises a silicon controlled rectifier.

6. The combination as claimed in claim 1 wherein said gated valve comprises a silicon controlled rectifier.

7. A circuit breaker for the protection of an electrical system comprising separable main contacts adapted to be connected in said system, operating means for opening and closing said main contacts, a tripping coil energizable to actuate said operating means to open said main contacts, a primary source of control voltage, first means connected between said source and said tripping coil and actuable to energize said tripping coil from said source, a voltage detecting circuit having an input connected to said source and being responsive to the voltage change of said source for producing an output pulse when the magnitude of said voltage decreases below a predetermined value, said voltage detecting circuit having first and second systems for detecting the presence of less than said predetermined minimum value of voltage of said primary source, a normally substantially nonconducting gated valve connected in circuit relationship with said tripping coil, said first system being capable of actuating said gated valve to energize said tripping coil to open said circuit interrupter in the presence of less than said predetermined minimum voltage at the primary source of control voltage when said circuit interrupter is closed, said first system including a first circuit for delaying said actuation of said gated valve for a predetermined time after less than said predetermined minimum voltage at said source of control voltage is first sensed, said first system comprising an electronic signaling device, a plurality of resistive elements, and a voltage reference means connected in circuit relationship with each other, said electronic signaling device having a plurality of input terminals and at least one output terminal, a first of said resistive elements having a movable terminal thereon, said resistive element with said movable terminal being connected in circuit relationship with said source of control voltage, said voltage reference means and a second of said resistive elements being connected in series circuit relationship with each other, the latter series circuit being connected to said primary voltage source in series circuit relationship, said electronic signaling device having a first input terminal connected to said movable terminal of said first resistive element and a second input terminal connected to a junction between the series circuit combination of said second of said resistive elements and said voltage reference means, said junction being maintained at a substantially constant voltage, said output terminal of said electronic signaling device being connected to said gate of said gated electrical valve, said movable terminal of said first resistive element being capable of being adjusted so that when the voltage of said primary source of voltage falls below a predetermined minimum value, the resulting difference in potential between said first and second input terminals of said electronic signaling device will change in such a manner as to produce an output signal at said output terminal of said electronic signaling device capable of actuating said gated electrical valve, said second system being capable of keeping said circuit interrupter open in the presence of less than said predetermined minimum voltage at the source of control voltage, an alternate voltage source comprising a capacitor and a plurality of diodes connected in circuit relationship with said primary voltage source and said gated valve, said capacitor being connected in circuit relationship with said diodes so that said primary voltage source may charge said capacitor, but discharge of said capacitor is substantially through said gated valve when said gated valve has been actuated by said first system to thereby energize said gated valve.

8. An undervoltage detection and triggering means as claimed in claim 7 wherein said first system additionally includes a first pulse shaping capacitance means, a unidirectional current conducting device having a generally fixed voltage drop regardless of the amount of current passed through it connected in series circuit relationship between said first and second input terminals of said electronic signaling device and said first pulse shaping capacitance means, said output terminal of said electronic signaling device being connected to said first pulse shaping capacitance means to form a network to shape said output signal.

9. An undervoltage detection and triggering means as claimed in claim 8 wherein said gated electrical valve comprises a solid state switch, said electronic signaling device comprises a unijunction transistor having a gate, an anode and a cathode, said diode having an anode and a cathode, said anode of said diode and said gate of said unijunction transistor being connected to said movable terminal of said potentiometer, said cathode of said diode and said anode of said unijunction transistor being connected to said junction of said voltage reference means and said second resistive element, said first circuit comprises a time delay capacitive element and a time delay diode, said time delay capacitive element being connected in parallel circuit relationship with said primary voltage source, said time delay capacitive element receiving charge from said primary voltage source and discharging upon the lowering of the voltage at said primary voltage source, said time delay diode being connected in series circuit relationship between one terminal of said primary voltage source and said first circuit to insure that when the primary voltage source decreases, the charge from the said time delay capacitive element is prevented from passing into said primary voltage source.

10. An undervoltage detection and triggering means as claimed in claim 9 wherein said second system comprises a voltage divider resistance network, said network being connected in series circuit relationship with said primary voltage source, said network including a junction terminal, a second voltage reference means and a remote signaling means being connected in circuit relationship with said junction terminal, said junction terminal being connected to said voltage reference means and said remote signaling means in such a manner that when the voltage of said primary voltage source drops below a predetermined minimum value, said voltage reference means responds to actuate said remote signaling means to prevent the main contacts of said circuit interrupter when open from being closed, said voltage divider resistance network including a fixed resistor connected in series with a variable resistor, said second voltage reference means comprising a Zener diode, said remote signaling means comprising a current actuated switching means connected to prevent energization of said closing coil during at least certain operating conditions, said current actuated switching means comprising a relay having a relay coil and contacts, said relay coil being connected in series circuit relationship with said last-mentioned Zener diode, said relay contacts being normally open, the value of resistance in said voltage divider resistance network being such that when said primary voltage source is above said predetermined minimum value, said Zener diode conducts to thereby energize said relay coil and maintain said contacts in the closed position, thus permitting energization of said closing coil.

11. An undervoltage detection and triggering means as claimed in claim 10 wherein said solid state switch comprises a silicon controlled rectifier.

12. An undervoltage detection and triggering means adapted to be connected to a source of voltage comprising a first voltage divider having the input terminals thereof connected to the output terminals of said source of control voltage, said first divider having a first divider output terminal intermediate said input terminals for providing therefrom relative to one of said input terminals a first divider output voltage which is a fraction of the voltage of said primary source of power, a second voltage divider having the input terminals thereof connected to the output terminals of said primary source of control voltage and including therein a voltage regulating device which provides a generally constant voltage thereacross regardless of the value of the output voltage of said primary source of voltage provided that said last mentioned output voltage is greater in absolute value than predetermined value, a second divider output terminal intermediate said second divider input terminals which is electrically connected to one terminal of said voltage regulating device for providing therefrom relative to one of said second divider input terminals a second divider output voltage which is generally a fraction of said voltage of said primary source and which is generally constant provided that said control voltage is generally larger in absolute value than said predetermined value, a multiterminal electrical control device having first and second input terminals connected respectively to said first and second divider output terminals and an output terminal, said multiterminal device producing a pulse of electrical energy at said output terminal when the voltage of said first terminal is significantly different from the voltage of said second terminal, and a normally substantially non-conducting gated valve having the gate terminal thereof connected to said output terminals of said multiterminal control device, said valve being actuable by said output pulse to a substantially conducting condition when said voltage decreases below said predetermined value to thereby provide an output current from said source.

13. The combination as claimed in claim 12, wherein said voltage regulating device comprised a Zener diode.

14. The combination as claimed in claim 12 wherein said multiterminal control device comprise a unijunction transistor, wherein said first terminal comprises the gate terminal of said uni-junction transistor, said second terminal comprises the anode terminal thereof and said output terminal comprises the cathode terminal thereof, said pulse of electrical energy being produced when the voltage at said gate is less by a predetermined value than the voltage of said cathode.

15. The combination as claimed in claim 14 wherein said voltage regulating device comprises a Zener diode.

16. The combination as claimed in claim 15 wherein said gated valve comprises a silicon controlled rectifier.

17. The combination as claimed in claim 12 wherein said gated valve comprises a silicon controlled rectifier.

18. An undervoltage detection and triggering means adapted to be connected to a source of voltage comprising a voltage detecting circuit having an input adapted to be connected to said source and responsive to the voltage of said source for producing an output pulse when said voltage decreases below substantially a predetermined value, a normally substantially non-conducting gated valve connected to said voltage detecting circuit, said valve being actuable by said output pulse to a substantially conducting condition when said voltage decreases below said predetermined value to thereby provide output current from said source, an additional source of voltage connected in circuit relation with said gated valve to assist in providing at least part of said output current when said valve is actuated to said substantially conducting condition, first and second system wherein said first system comprises a first circuit for delaying said actuation of said gated valve for a predetermined time period after the time that less than said predetermined minimum voltage at said primary voltage source is first sensed, said first system comprising an electronic signaling device, a plurality of resistive elements, and a voltage reference means connected in circuit relationship, said electronic signaling device having a plurality of input terminals and at least one output terminal, a first of said resistive elements having a movable terminal, said resistive element with said movable terminal being connected in series circuit relationship with said primary voltage source, said voltage reference means and a second of said resistive elements being connected in series circuit relationship, the latter series circuit being connected to said primary voltage source, said electronic signaling device having a first input terminal connected to said movable terminal of said first resistive element and a second input terminal connected to a junction between the series circuit which includes said second resistive element and said voltage reference means, said junction being maintained at a substantially constant voltage, said output terminal of said electronic signaling device being connected to said gate of said gated electrical valve, said movable terminal of said first resistive element being capable of being adjusted such that when the voltage of said primary voltage source falls below a predetermined minimum value, the resulting difference in potential between said first and second input terminals of said electronic signaling device will change in such a manner as to produce an output signal at said output terminal of said electronic signal device capable of actuating said gated electrical valve, said alternate source of voltage comprising a capacitor and a plurality of diodes connected in circuit relationship with said primary voltage source and said gated valve, said capacitor being connected in circuit relationship with said diodes in such a manner that said primary voltage source may charge said capacitor, but discharge of said capacitor is possible only through said gated valve when it is actuated by said first system.

19. An undervoltage detection and triggering means as claimed in claim 18 wherein said first system includes a unidirectional current carrying device having a generally fixed voltage drop thereacross substantially independent of the amount of current passing therethrough connected in series circuit relationship between said first and second input terminals of said electronic signaling device, a first pulse shaping capacitance means, said output terminal of said electrical signaling device being connected to said first pulse shaping capacitance means to form a network to shape said output signal.

20. An undervoltage detection and triggering means as claimed in claim 19 wherein said electrical valve comprises a solid state switch, said electronic signaling device comprises a unijunction transistor having a gate, an anode and a cathode, said diode having an anode and a cathode, said anode of said diode and said gate of said unijunction transistor being connected to said movable terminal of said potentiometer, said cathode of said diode and said anode of said unijunction transistor being connected to said junction of said voltage reference means and second resistive element, said first circuit comprises a time delay capacitive element and a time delay diode, said time delay capacitive element being connected in parallel circuit relationship with said primary voltage source, said time delay capacitive element receiving charge from said primary voltage source and discharging upon the lowering of the voltage at said primary voltage source, said time delay diode being connected in series circuit relationship between one terminal of said primary voltage source and said first circuit such that when the primary voltage source decreases, the charge from the said time delay capacitive element is prevented from discharging into said primary voltage source.

21. An undervoltage detection and triggering means as claimed in claim 20 wherein said second system comprises a voltage divider resistance network, said network being connected in series circuit relationship with said primary voltage source, said network having an interconnected junction terminal, and a second voltage reference means and a remote signaling means are connected in circuit relationship with said junction terminal in such a manner that when the voltage of said primary voltage source drops below a predetermined minimum value, said voltage reference means responds to actuate said remote signaling to prevent an external circuit from being actuated, said voltage divider resistance network comprises a fixed resistor connected in series with a variable resistor, said second voltage reference means comprising a Zener diode, said remote signaling means comprising a current actuated switching means capable of preventing energization of said external circuit, said actuated switching means comprising a relay having a relay coil and contacts, said relay coil being connected in series circuit relationship with said Zener diode, said relay contacts being normally open, the value of resistance in said voltage divider resistance network being such that when said primary voltage source is above said predetermined minimum value, said Zener diode conducts to energize said relay coil to thereby maintain said contacts in the closed position to permit the energization of said closing coil.

22. An undervoltage detection and triggering means as claimed in claim 21 wherein said solid state switch comprises a silicon controlled rectifier.

* * * * *